(12) United States Patent
Tongiani

(10) Patent No.: US 11,498,137 B2
(45) Date of Patent: Nov. 15, 2022

(54) MACHINE FOR SIMULTANEOUS CUTTING OF A PLURALITY OF SLABS FROM A BLOCK OF STONE MATERIAL

(71) Applicant: Sfera S.R.L., Massa (IT)

(72) Inventor: Stefano Tongiani, Massa (IT)

(73) Assignee: Sfera S.R.L., Massa (IT)

( * ) Notice: Subject to any disclaimer, the term of this patent is extended or adjusted under 35 U.S.C. 154(b) by 0 days.

(21) Appl. No.: 16/760,459

(22) PCT Filed: Nov. 2, 2018

(86) PCT No.: PCT/IT2018/050214
§ 371 (c)(1),
(2) Date: Apr. 30, 2020

(87) PCT Pub. No.: WO2019/087224
PCT Pub. Date: May 9, 2019

(65) Prior Publication Data
US 2020/0338653 A1    Oct. 29, 2020

(30) Foreign Application Priority Data
Nov. 2, 2017 (IT) .......................... 102017000124452

(51) Int. Cl.
*B23D 53/00* (2006.01)
*B23D 55/08* (2006.01)
(Continued)

(52) U.S. Cl.
CPC .......... *B23D 53/005* (2013.01); *B23D 55/082* (2013.01); *B28D 1/086* (2013.01); *E21C 25/22* (2013.01)

(58) Field of Classification Search
CPC ..... B23D 53/005; B23D 55/082; E21C 25/22; B28D 1/086
See application file for complete search history.

(56) References Cited

U.S. PATENT DOCUMENTS

| 4,061,066 | A | * | 12/1977 | Mueller | .................. B27B 15/08 |
| | | | | | 83/808 |
| 4,191,159 | A | * | 3/1980 | Frosch | .................. B28D 5/007 |
| | | | | | 125/21 |

(Continued)

FOREIGN PATENT DOCUMENTS

| CN | 1101314 | 4/1995 |
| CN | 101357489 | 2/2009 |

(Continued)

OTHER PUBLICATIONS

International Search Report and the Written Opinion dated Feb. 19, 2019 From the International Searching Authority Re. Application No. PCT/IT2018/050214. (13 Pages).

(Continued)

*Primary Examiner* — Sean M Michalski

(57) ABSTRACT

The present invention concerns a Machine (10, 10') for simultaneous cutting of a plurality of slabs (18) from a block (B) of stone material through a plurality of band saw blades (11), wherein each of said band saw blades (11) is closed in a loop between a respective driving pulley (12) or a shared driving drum and a respective driven pulley (13) or a shared driven drum, said driving pulleys (12) or said shared driving drum rotating around a first axis (A) of rotation, or respective first axes of rotation parallel to each other, and said driven pulleys (13) or said shared driven drum rotating around the same second axis (A') of rotation, parallel to said first axis (A) of rotation, or respective second axes of rotation parallel to each other and parallel to said first axes of rotation, said axis (A) of rotation of the driving pulleys (12) or of said shared driving drum and said axis of rotation (A') of the driven pulleys (13) or of said shared driven drum being in turn mounted on a frame (14) movable with respect to said block of stone material, along two directions (x,y) incident to each other, one direction (x) of cutting said block (B) of stone material, said direction (x) of cutting being disposed on a plane (τ) of cutting of said slabs (18), said plane (τ) of cutting being in its turn incident with respect to a direction (y) of relative advancement of said block (B) of stone material with respect to said frame (14), characterised in that the plane (π) to which said direction (x) of cutting and said direction (y) of relative advancement of said block (B)

(Continued)

of stone material with respect to said frame (14) belong is horizontal and at least the portion of the path of each of said band saw blades (11) included between respective movable spacers (19) is inclined with respect to the vertical of an angle ($\beta$) comprised between 3 and 20° in the direction of cutting.

16 Claims, 3 Drawing Sheets

(51) Int. Cl.
  *E21C 25/22* (2006.01)
  *B28D 1/08* (2006.01)

(56) References Cited

U.S. PATENT DOCUMENTS

| | | | | |
|---|---|---|---|---|
| 6,513,514 | B1* | 2/2003 | Micheletti | B23D 57/0069 |
| | | | | 125/16.02 |
| 2011/0000355 | A1* | 1/2011 | Lin | B23D 53/005 |
| | | | | 83/796 |
| 2015/0053196 | A1* | 2/2015 | Bennett | B23D 61/185 |
| | | | | 125/21 |
| 2020/0338653 | A1* | 10/2020 | Tongiani | B23D 53/005 |

FOREIGN PATENT DOCUMENTS

| | | | | |
|---|---|---|---|---|
| CN | 202607765 | | 12/2012 | |
| CN | 105643010 | | 6/2016 | |
| GB | 190919620 A | * | 8/1910 | ............ B28D 1/086 |
| JP | 2017-117992 | | 6/2017 | |
| SU | 738873 | | 6/1980 | |
| WO | WO 2019/087224 | | 5/2019 | |

OTHER PUBLICATIONS

Notification of Office Action and Search Report dated Aug. 24, 2021 From the State Intellectual Property Office of the People's Republic of China Re. Application No. 201880071778.8 and Its Translation of Office Action Into English. (15 Pages).
Notification of Office Action dated May 13, 2022 From the State Intellectual Property Office of the People's Republic of China Re. Application No. 201880071778.8 and Its Translation Into English. (10 Pages).

* cited by examiner

MACHINE FOR SIMULTANEOUS CUTTING OF A PLURALITY OF SLABS FROM A BLOCK OF STONE MATERIAL

RELATED APPLICATIONS

This application is a National Phase of PCT Patent Application No. PCT/IT2018/050214 having International filing date of Nov. 2, 2018, which claims the benefit of Italian Patent Application No. 102017000124452 filed on Nov. 2, 2017. The contents of the above applications are all incorporated by reference as if fully set forth herein in their entirety.

FIELD AND BACKGROUND OF THE INVENTION

The present invention concerns a machine for simultaneous cutting of a plurality of slabs from a block of stone material.

The invention refers to the field of processing machines of stone blocks extracted from the quarries to obtain slabs to be used as semi-finished products in the various possible fields of application.

It is known that the main technologies used for cutting stone blocks consist of single-blade and multi-blade frame machines and single-wire and multi-wire frame machines.

The single-blade frame systems consist of a metal structure that acts as a guide for a blade that performs a translational straight motion, back and forth, on the block. The blade, equipped with diamond concretions on its lower part, cuts the block under constant water sprinkling and proceeds downwards at a determined advancement speed (up to 100 cm/h). The multi-blade systems are based on the same cutting technology, but are equipped with several blades, having different characteristics depending on the material being processed and appropriately spaced and tensioned. This type of system can be used not only for framing, but also for obtaining thick slabs. The single and multi-blade frame machines have the limit that the reciprocating movement of the blades does not allow high cutting speeds, due to the necessary inversion of the motion, and this leads to a misuse of the diamond of the tools, whose optimal use would require high cutting speeds. Furthermore, a non-optimal cut has the consequence that the blade must be very strongly pushed against the block and to be able to do it must be very robust, which limits the possibility of making thin blades.

The single-wire or multi-wire frame machines are based on the use of one or more diamond wires, which perform the same functions as the blades of single and multi-blade frame machines, but also allow the cutting of granites. These are plants with an open structure below which a stone block can be positioned in the most appropriate way while the diamond wires, which operate with circular motion on a closed circuit, are made to slide and penetrate into the block. Also in this case, the operation is carried out in the presence of water. This type of machine operates cutting the stone block with a circular motion of the tool, allowing to reach high cutting speeds and therefore a very fast cutting of the block. However, being a wire, the cutting tool is fragile and not very strong if it is tensioned with force in order to have a flat and planar cut and this limits its minimum diameter and consequently involves a high amount of processing waste.

In conclusion, multi-wire/multi-blade frame machines have the limit of not being able to operate below a certain thickness of leftover due to cutting, a consequence of the diameter/thickness of the wire/blade of 4.5 mm under which for technical and safety reasons it is not appropriate to operate, as well as that of a poor cutting precision, when operating with sustained advances of the cutting line in the block, due to the elasticity of the wire, only tensionable in moderate way due to its low tensile strength.

In addition to the machines described above, in the marble cutting field there are also machines using a diamond circular blade, placed horizontally. The fact of placing the blade horizontally creates great limits, as the slab has a weight after being cut and being suspended would break. Therefore the cutting of the machine always requires the presence of an operator and is not suitable for large scale automated production. Moreover, this type of machine is not suitable for multiple cutting, with the result that the cutting times of an entire block (a block generates about 80 slabs) are too long. Moreover, again due to the horizontal arrangement of the blade, the refrigerating fluid cannot enter well into the cut (with a shortening of the useful life of the diamond). Finally, the force of gravity, even if the blade is kept under tension, always generates a slight bending of the blade, due to the force of gravity acting on the blade, with the consequence of producing slabs with a concavity facing upwards.

CN1101314A and US2001/000355 show machines for the simultaneous cutting of a plurality of slabs from a block of stone material, which make use of a plurality of band saw blades, closed in a loop between a conducting drum and a driven drum, each band saw blade being associated with a respective spacer, so that the band saw blades are offset from each other.

SUMMARY OF THE INVENTION

In this context it is proposed the solution according to the present invention, designed to obtain slabs from blocks of stone material, reducing to the maximum the processing waste.

These and other results are obtained according to the present invention by proposing a machine for simultaneous cutting of a plurality of slabs from a block of stone material comprising a plurality of diamond band saw blades closed in a loop around two rollers carried by a frame, said bands being arranged parallel to each other, each band turning tensioned between two respective pulleys, in which preferably the distance between the plane of cuttings of the bands can be changed quickly and efficiently, without requiring long periods of stoppage of the working cycle and in which at least the portion of the path of each of said band saw blades comprised between the respective movable spacers is inclined with respect to the vertical of an angle comprised between 3 and 20° in the cutting direction.

The aim of this invention is therefore to provide a machine for simultaneous cutting of a plurality of slabs from a block of stone material which allows to overcome the limits of the cutting machines according to the prior art and to obtain the previously described technical results.

A further object of the invention is that said machine for the simultaneous cutting of a plurality of slabs from a block of stone material can be realized with substantially low costs, both as regards production costs and management costs.

Not least object of the invention is to propose a machine for the simultaneous cutting of a plurality of slabs from a block of stone material that is simple, safe and reliable.

It therefore forms a specific object of the present invention for a machine for simultaneous cutting of a plurality of slabs from a block of stone material by means of a plurality of band saw blades, each of which is closed in a loop between a respective driving pulley or a shared driving drum and a respective driven pulley or a shared driven drum, said driving pulleys or said shared driving drum rotating around a same first axis of rotation, or respective first axes of rotation parallel to each other, and said driven pulleys or said shared driven drum rotating around a same second axis of rotation parallel to said first axis of rotation, or around respective second axes of rotation parallel to each other and parallel to said first axes of rotation, said axis of rotation of said driving pulleys or of said shared driving drum and said axis of rotation of said driven pulleys or of said shared driven drum being in turn mounted on a frame movable with respect to said block of stone material along two directions incident to each other, preferably perpendicular to each other, a direction of cutting of said block of stone material, said direction of cutting being arranged on a plane of cutting of said slabs, said plane of cutting being in turn incident, preferably perpendicular, with respect to a direction of relative advancement of said block of stone material with respect to said frame, and wherein the plane to which said direction of cutting and said direction of relative advancement of said block of stone material with respect to said frame belong is horizontal and at least the portion of the path of each of said band saw blades comprised between respective movable spacers is inclined with respect to the vertical by an angle comprised between 3 and 20° in the direction of cutting.

Preferably, again according to the invention, said machine for simultaneous cutting of a plurality of slabs from a block of stone material comprises for each band saw blade a pair of movable spacers arranged along the path of said band saw blade, respectively a first mobile spacer near a respective driving pulley and a second mobile spacer near a respective driven pulley, each of said movable spacers being provided with a sliding surface for said band saw blade, on which the flat side of said band saw blade is allowed to slide, the sliding surfaces of the movable spacers of each pair of movable spacers and the flat side of the respective band saw blade, in the portion of its path comprised between said movable spacers, being arranged on the same sliding plane, parallel to the sliding planes of the other pairs of mobile spacers and to said plane of cutting.

Preferably, according to the present invention, each of said movable spacers comprises hydrostatic pads or, more preferably, a combination of hydrostatic pads and hydrodynamic pads.

Preferably, according to the present invention, each pair of movable spacers is provided with displacement means adapted to modify the relative distance between the sliding planes of said pair of movable spacers and the sliding planes of the other pairs of movable spacers, maintaining said sliding plane parallel to said plane of cutting.

More preferably, again according to the invention, said frame is mounted with the possibility of rotation on a plane perpendicular to said plane of cutting. Alternatively, according to the invention, said axis of rotation of the driving pulleys and said axis of rotation of the driven pulleys are mounted with possibility of rotation on respective planes perpendicular to said plane of cutting.

Furthermore, again according to the present invention, said displacement means adapted to modify the relative distance between the sliding plane of said pair of movable spacers and the sliding planes of the other pairs of movable spacers may include interchangeable spacers or a linear displacement mechanism.

Moreover, according to the present invention, said machine for the simultaneous cutting of a plurality of slabs from a block of stone material comprises means for tensioning said band saw blades, preferably a sliding carriage for each band saw blade, each slide sliding independently of the others, or one or more tensioning pulleys for each band saw blade, or still comprising, for each driven pulley of each band saw blade, an independent fork provided with displacement means along the direction which defines the distance between the axis of rotation of each driven pulley and the axis of rotation of the shared driving drum.

Finally, according to the invention, said forks can be provided with means of rotation about an axis perpendicular to the plane of cutting.

The effectiveness of the machine for simultaneous cutting of a plurality of slabs from a block of stone material of the present invention is evident, which allows to obtain at the same time the typical advantages of multi-blade and single-blade frame machines and of multi-wire and single-wire frame machines, having the cutting speed of a circular tool and always running in the same direction and an intrinsic thinness achievable in the blades while maintaining a high tension-resistant section.

BRIEF DESCRIPTION OF THE SEVERAL VIEWS OF THE DRAWINGS

The present invention will now be described, by way of illustration, but not by way of limitation, according to a preferred embodiment thereof, with particular reference to the figures of the attached drawings, in which.

DESCRIPTION OF SPECIFIC EMBODIMENTS OF THE INVENTION

Figure 1:
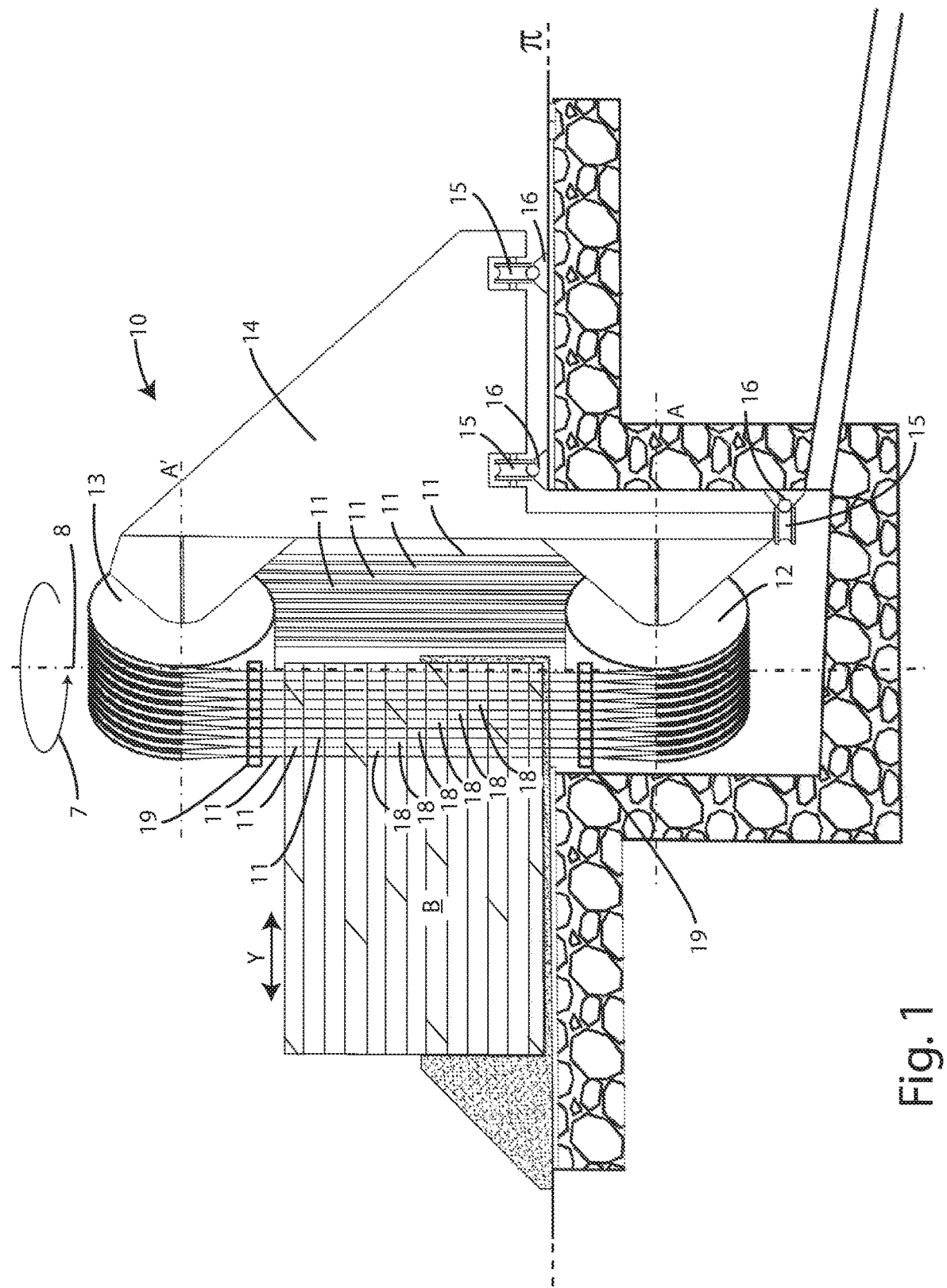
FIG. 1 shows a schematic elevation view of a machine for simultaneous cutting of a plurality of slabs from a block of stone material according to a first embodiment of the present invention.
Figure 2:
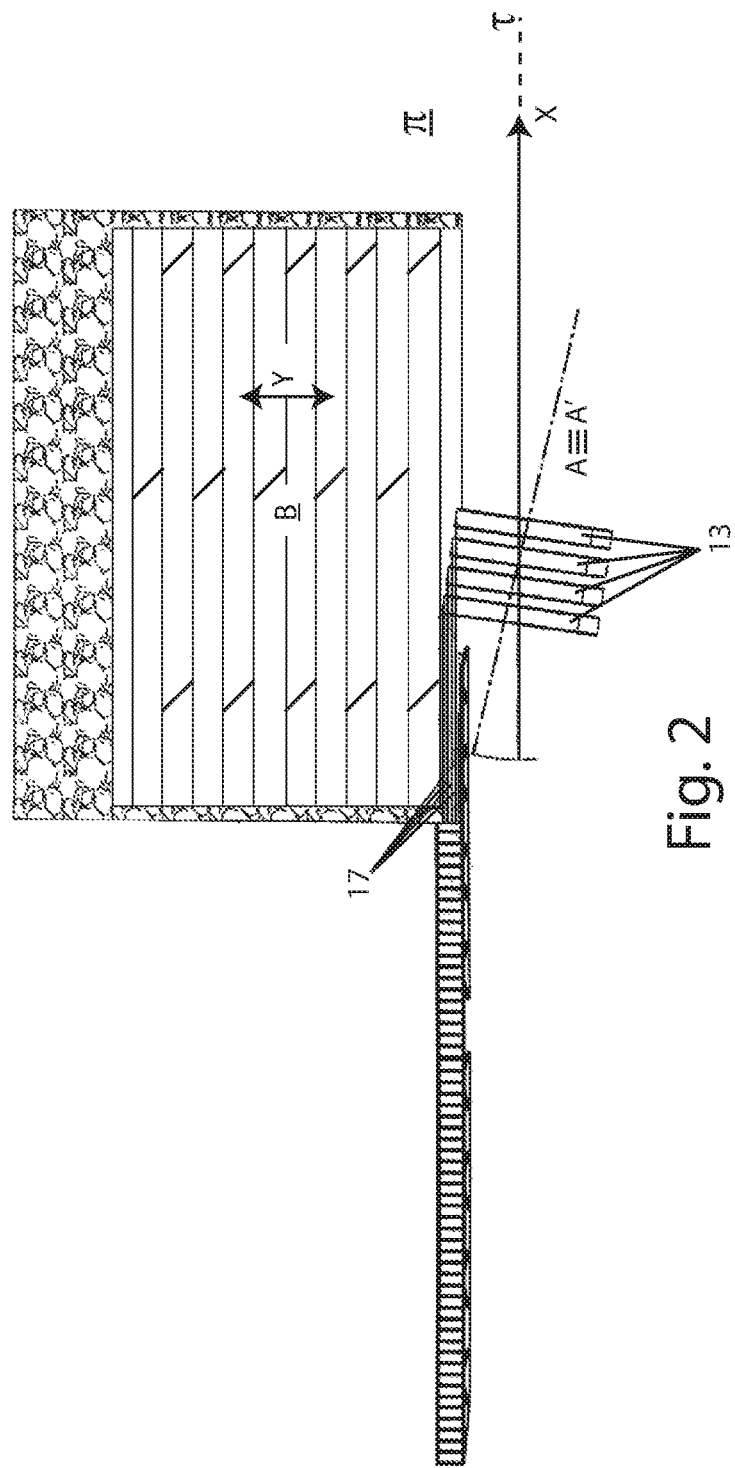
FIG. 2 shows a schematic top view of the machine of FIG. 1.

Making reference preliminarily to FIGS. 1 and 2, a machine for simultaneous cutting of a plurality of slabs from a block of stone material according to the present invention, indicated by the numeral reference 10, comprises a plurality of diamond band saw blades 11, each of which is closed in a loop between a driving pulley 12 and a driven pulley 13, all the driving pulleys 12 rotating around the same first axis of rotation A, and all the driven pulleys 13 rotating about the same second axis of rotation A', said first axis of rotation A and said second axis of rotation A' being in turn mounted on a frame 14 provided with wheels 15 which rest on rails 16, which allow the frame 14 to move along a direction x of cutting of said block B of stone material, said direction x of cutting being arranged on a plane τ of cutting of a block B of stone material to obtain a plurality of slabs 18, said plane τ of cutting being in turn orthogonal to a direction y of relative advancement of said block B of stone material to be cut in the form of slabs 18 with respect to said frame 14, in the case shown by way of example in the attached FIGS. 1 and 2 said direction y of relative advancement of said block B of stone material being horizontal.

The first axis of rotation A of the driving pulleys 12 and the second axis of rotation A' of the driven pulleys 13 are mounted on said frame 14 with the possibility of rotation on respective planes parallel to the plane to which said direction x of cutting and said direction y of relative advancement of said block B of stone material with respect to said frame 14, i.e., in the case shown by way of example in the attached FIGS. 1 and 2, on horizontal planes. The rotation of the axes of rotation A, A' allows them to vary the angle α formed with respect to the direction x of cutting, i.e. it allows to arrange the flat side of said diamond band saw blades 11 on more or less aligned planes towards the plane τ of cutting of block B of stone material. The greater or lesser alignment of the diamond band saw blade 11 with respect to the plane τ of cutting of the block B of stone material allows to obtain a greater or lesser distance between the band saw blades 11 themselves with respect to the direction x of cutting, or a greater or lesser thickness of the slabs 18 obtained from the cuts 17. The correct positioning of the diamond band saw blades 11 with respect to the cuts 17 to be performed requires that the flat side of the band saw blades 11 always be disposed parallel to the plane τ of cutting. For this reason, the angulation of the portion of each band saw blade 11 in contact with the block B of stone material is ensured by means of two movable spacers 19 arranged along the path of each band 11, respectively a first movable spacer 19 in proximity the driving pulley 12 and a second movable spacer 19 in the vicinity of the driven pulley 13, which rotate the portion of each band saw blade 11 in contact with the block B of stone material with respect to the angle which would have as a consequence of only the rotation of the first axis of rotation A of the driving pulleys 12 and of the second axis of rotation A' of the driven pulleys 13.

The driving pulleys 12 and/or the driven pulleys 13 can be mounted on sliding slides (not shown) independently operated to keep each band saw blade 11 correctly tensioned. The independent tensioning of each band saw blade 11 is due to the fact that, necessarily, the band saw blades 11 have a length slightly different from each other, due to unavoidable constructive errors or different elongations during operation. In addition, the sliding slides allow to loosen the respective band saw blades 11 and remove them to replace them, that is, for example, to work only with some of the band saw blades.

As an alternative, in order to keep the band saw blades 11 under tension, it is possible to provide additional pulleys, suitable for tensioning, at the part of the path of the band saw blade 11 not interested in the cutting of the block B of stone material.

The band saw blades 11 cut the block B of stone material in successive passages. Still referring to the case shown by way of example in the accompanying FIGS. 1 and 2, the path of the portion of the band saw blades 11 cutting the block B of stone material is vertical, with the following advantages. Firstly, the cutting performed with the band saw blades 11 mounted vertically rather than horizontally to the ground, such as the traditional frames, allows to attack the block B of stone material on its shorter side (the height), with the consequence that the free length of the band saw blades 11 which pushes on the block B of stone material is as short as possible. This determines the possibility of imparting to the band saw blades 11 a greater thrust in the direction x of cutting, obtaining advances greater than those achievable by cutting a block B of stone material, for example, from top to bottom, in the last case being necessary to have longer and therefore less stable and easily deflected band saw blades 11, resulting in crooked cuts. The vertical position, moreover, is particularly indicated for a correct evacuation of the cutting residues, allowing to obtain a better surface finish of the slabs 18 and a longer life of the band saw blades 11.

Advantageously, in a preferred embodiment of the present invention, the path at least of the portion of the band saw blades 11 which cuts the block B of stone material is slightly inclined with respect to the vertical, in particular at an angle comprised between 3 and 20°, preferably at an angle of about 13°, in the direction x of cutting. In this way, the band saw blades 11 touch the block B of stone material first in its upper part and then, advancing in the direction x of cutting, gradually lower and lower. This inclination allows the cooling water which is fed into the cut during processing to not immediately move away from the area where the separation of material takes place, but to remain between the band saw blades 11 and the stone material down to the exit from the cuts 17, which occurs in the lower part of the block B of stone material. This guarantees a better cooling, and consequently allows a higher feed rate, a better removal of the cut material and therefore a better durability of the band saw blades 11 and a better surface finish of the plate.

The choice of inclining the path at least of the portion of the band saw blades 11 which cuts the block B of stone material goes against what would have been deemed advantageous by an expert in the field, in that the inclination lengthens the stroke of the band saw blades 11 in the block of stone material B to be cut, which entails a greater size of the runways and the foundations of the machine 10, with the relative costs, as well as the increase in height of the machine 10 as a whole (this machine being apt to cut blocks of stone material of about 2.5 meters in height, the overall height of the machine exceeds 7 meters), which makes it unsuitable for use in systems that are not sufficiently high.

Moreover, the inclination of the band saw blades 11 also entails another great increase in cycle times, because it requires a very high increase in the cutting transient, i.e. in that step during which the band saw blades 11 are already in contact with the block B of stone material but have not yet completely entered the block B itself, or the subsequent step during which the band saw blades 11 exit from the block B. This step is a very time-consuming step, because in this step the band saw blade 11 tends to skid, not being guided by the block of stone, with the need to heavily reduce the speed of advancement of the machine 10.

Finally, tilting the band saw blades 11 increases the blade length involved in contact with the block and this involves the need to move the movable spacers 19 away from each other, with respect to the case where the band saw blades 11 are vertical, with the consequence of increasing the possibility of skidding of the blade and therefore the need to reduce the speed of advancement of the band saw blades 11 inside the block.

Finally, the band saw blades 11, during cutting, are followed by a roller conveyor (not shown), with unidirectional rollers, to support the slabs 18 immediately after being cut.

Figure 3:
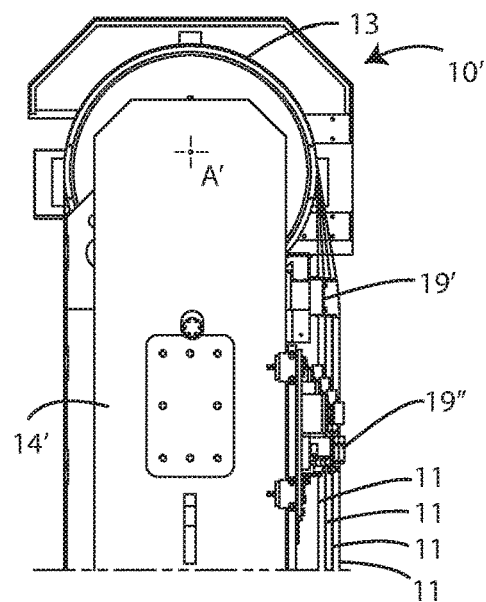
FIG. 3 shows a side view the upper part of a machine for the simultaneous cutting of a plurality of slabs from a block of stone material according to a second embodiment of the present invention.
Figure 4:
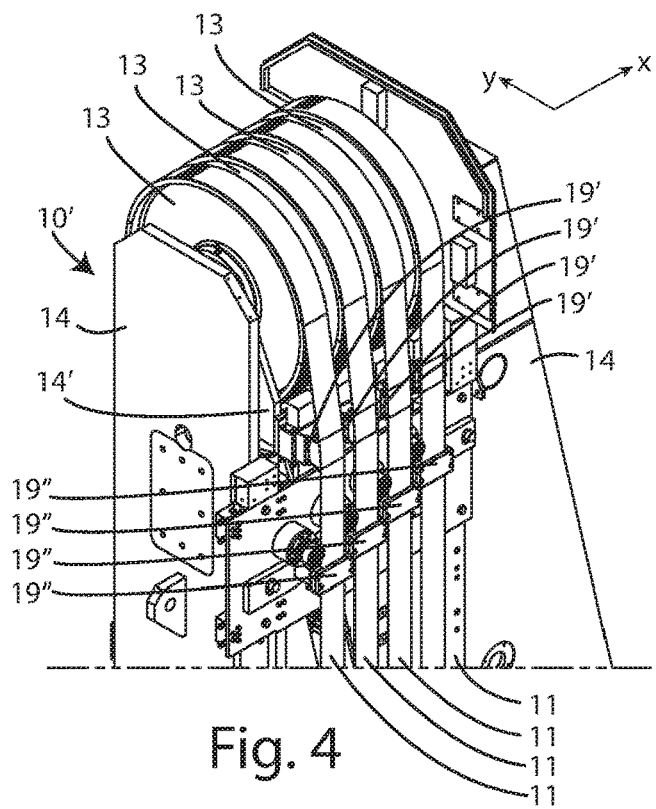
FIG. 4 shows a perspective view of the machine of FIG. 3.
Figure 5:
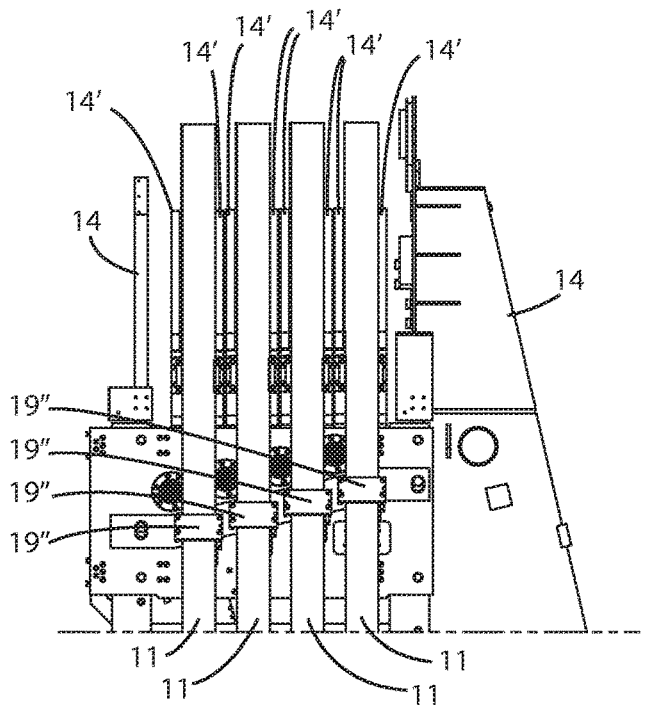
FIG. 5 shows a front view of the machine of FIG. 3.

Making reference to FIGS. 3, 4 and 5, it is shown a second embodiment of the machine for the simultaneous cutting of a plurality of slabs from a block of stone material according to the present invention, designated by the reference numeral 10', in which band saw blades 11 are closed in a loop between a shared driving drum, which rotates around an axis A, and respective driven pulleys 13, in particular a driven pulley 13 for each band saw blade 11. Each driven pulley 13 is supported by an independent fork 14' provided with displacement means along the direction defining the distance between the axis of rotation of each driven pulley 13 and the axis of rotation of the shared driving drum.

Unlike the embodiment shown in FIGS. 1 and 2, in this second embodiment the axis A and the axes A' cannot rotate on respective planes parallel to the plane to which the direction x of cutting and the direction y of relative advancement of block B of stone material with respect to the frame 14 belong. Adjustment of the greater or lesser distance between the band saw blades 11 with respect to the direction x of cutting, is adjusted by means of movable spacers, respectively a first mobile spacer 19', 19" in proximity of the shared driving drum and a second movable spacer 19', 19" in the vicinity of the driven pulleys 13. Each movable spacer 19', 19" is composed of a hydrostatic pad 19' and a hydrodynamic pad 19", which allows an unlimited life of the pads (there being no direct contact between pads 19', 19" and band saw blades 11) and also prevents the band saw blades 11 from being induced to breakage (as will be explained in greater detail hereinafter, a pad can confer to the blade a very wide curvature, even of the order of meters, while, for example, the use of rollers, which must rotate, forces to use very small spokes, of the order of centimeters, going to bend the blade at each passage in a very stressful way). In fact, in order to make the life of band saw blades 11 very long, it is necessary to bend them as little as possible at the level of curvature in the various windings on pulleys and runners.

In particular, the presence of hydrostatic pads 19' allows the band saw blades 11 to come out of the tangent line of the driving drum and driven pulleys 13, while the presence of hydrodynamic pads 19" (or wheels) is needed to protect the blade from side heels.

The presence of hydrostatic pads 19' is very important, since, in order to perform a multiple cut, it is necessary to space the band saw blades 11 from the vertical tangent to the pulleys, this displacement being also of several centimeters (for example 12 cm). This displacement can also be performed with wheels or with dry sliding pads or with hydrodynamic pads, but by comparing all these solutions to each other it is evident that the hydrostatic pads represent the preferable solution, in consideration of the fact that the speed of the band saw blades 11 is greater than 40 m/s and at the same time the contact pressure between the band saw blades 11 and the pads 19' is greater than 2 bar, for a total thrust equal to about 1t on each individual pad. Another requirement is that the radius of curvature of the element which moves the blade 11 must be as high as possible and in any case wider than the radius of the shared driving drum 12 and of the driven pulleys 13, otherwise it would overload the band saw blades 11, bending them at their passage and nullifying the advantage of using very large pulleys so as not to stress the blades.

Summarizing, the speed and the load eliminate the good functioning of pads operating in dry conditions that do not withstand the required pressure and speed values, the need for wide bending radii (over 1 meter) makes virtually any type of wheel useless.

Furthermore, it is important that each of said movable spacers comprises at least one hydrostatic sliding pad 19', the hydrodynamic pads 19" being preferably used in association with the hydrostatic pads 19', due to the fact that at the start of the shared driving drum motor, the machine otherwise would cause the blades to rub on the hydrodynamic pads 19" until a minimum blade sustaining speed is reached, and since the machine for the simultaneous cutting of a plurality of slabs from a block of stone material according to the present invention stops frequently, in particular about every 3 hours, to cut a new block of stone material B, the wear would be unacceptable; and also due to the fact that the power absorbed by hydrodynamic pads is very high compared to that absorbed by the hydrostatic pads and this makes them less convenient; by way of example, in the machine 10 shown in FIGS. 3 and 4 there are eight hydrostatic pads, which consume about 4 kW in supporting the respective band saw blades 11, while if this role were only delegated to hydrodynamic pads, of comparable size, the consumption would increase up to about 20 kW, which is unacceptable for a machine that has an engine for driving the shared driving drum of about 50-60 kW.

Finally, according to the embodiment of the present invention shown with reference to FIGS. 3, 4 and 5, in the machine 10 for simultaneous cutting of a plurality of slabs from a block of stone material B the driven pulleys 13 are each supported by a respective fork 14', independent of the forks 14' of the other driven pulleys 13 and with the possibility of linear displacement along the direction defining the distance between the axis of rotation of each driven pulley 13 and the axis of rotation of the shared driving drum. This allows a very precise tensioning of the band saw blades 11, with respect to a tensioning system, placed behind the cutting area, which acts orthogonally with respect to each blade, in that the tensioning of the fork is parallel to the two tensioned branches of the blade itself.

Another very important advantage deriving from the use of independent forks 14' to support the driven pulleys 13 is that, by rotating a few degrees each fork 14' around an axis perpendicular to the plane τ of cutting, it is possible to adjust very accurately the parallelism between axis A' of the respective driven pulley 13 and axis A of the shared driving drum, thus creating small misalignments, indispensable for stabilizing the blade in position against the tooth present in the driven pulleys 13 and in the shared driving drum. The fact that the forks 14' are all separated allows to individually adjust each single band saw blade 11, a feature of primary importance in a machine 10 having a plurality of very stretched band saw blades 11, where the structural deformations are important and must be corrected and compensated in a specific and timely manner. By way of example, in a machine for simultaneous cutting of a plurality of slabs from a block of stone material, the drum can be pulled upwards with about 50t and in the center it is inflated by 0.2 mm of maximum displacement. These deformations must be compensated on each blade differently. By adjusting the inclination of the forks 14', the band saw blades 11 are then laid down against said tooth, also overcoming the gravity force component. The inclination must be such as to hold the blade in place, without pressing too much, so as not to wear the tooth itself prematurely.

Thanks to the adjustment of the forks 14', the surface of the driving drum 12 and of the driven pulleys 13 in contact with the blade is cylindrical instead of being curved, as shown in the patent application CN1101314A. The machine 10 for simultaneous cutting of a plurality of slabs 18 from a block B of stone material according to the present invention, using bands 11 in place of the diamond wires or blades used in the frame machines according to the prior art allows to take advantage of five advantages:

1. greater rigidity with respect to the diamond wires, since it is possible to greatly tension the bands 11, which have a high resistant section although they are thin in the cutting direction;

2. a high cutting speed compared to traditional blades, not operating with reciprocating motion;

3. a longer working life compared to the blades, due to the unidirectional movement of the bands 11, since the diamond lasts much longer if it cuts only in one direction, because the binder placed at the base of the granule is not undermined;

4. a very thin cutting section;

5. a higher speed of advancement and a longer life of the bands 11, due to the fact that, by cutting vertically, the evacuation of the freshly cut material, which is promptly reciprocated with refrigerant, is favored.

By way of example, in order to obtain cuts 17 of 2 mm in thickness, bands 11 with a thickness of 0.9 mm and a width of 100 mm (resistant section 90 mm$^2$) with deposited diamond beads having a diameter of 0.55 mm can be used. For comparison, the resistant section of a wire for multiwire with a 5 mm cut (wire diameter 3.5 mm and bead diameter around it 5 mm) is equal to 9 mm$^2$. It follows that with the machine 10 for simultaneous cutting of a plurality of slabs 18 from a block B of stone material according to the present invention, it is possible to obtain a cut about half of the width with a resistant section of the tool equal to 10 times compared to the diamond wires.

The present invention has been described by way of illustration, but not by way of limitation, according to its preferred embodiments, but it is to be understood that variations and/or modifications may be made by those skilled in the art without departing from the relative scope of protection, as defined by the attached claims.

What is claimed is:

1. A machine (10, 10') for simultaneous cutting of a plurality of slabs (18) from a block (B) of stone material, the machine having:
   a plurality of band saw blades (11), wherein each of said plurality of band saw blades (11) is closed in a loop between a first driving pulley (12) or a first shared driving drum and a second driven pulley (13) or a second shared driven drum;
   wherein said first driving pulley (12) or said first shared driving drum and said second driven pulley (13) or said second shared driven drum are respectively rotating around a first axis (A) of rotation and a second axis (A') of rotation parallel to said first axis (A) of rotation;
   wherein said first axis (A) of rotation and said second axis of rotation (A') are mounted on a frame (14);
   wherein the frame and said block of stone material are movable relative to one another along incident directions (x,y);
   wherein the direction (y) is a direction of advancement of said block (B) to be cut into the plurality of slabs (18) by the plurality of band saw blades (11);
   wherein the direction (x) is a direction of cutting said block (B) of stone material by each of the plurality of band saw blades (11),
   wherein a plurality of spacers (19, 19', 19") supporting a portion of each of said plurality of band saw blades (11) in parallel to a plane (τ) which is incident with respect to the direction (y) and;
   wherein the supported portion of each of said plurality of band saw blades (11) is inclined with respect to a vertical of an angle of between 3 and 20° in the direction (y).

2. The machine (10, 10') for simultaneous cutting of a plurality of slabs (18) from a block (B) of stone material according to claim 1, wherein said direction (x) of cutting and said direction (y) of relative advancement of said block (B) of stone material with respect to said frame (14) are perpendicular to each other.

3. The machine (10, 10') for simultaneous cutting of a plurality of slabs (18) from a block (B) of stone material according to claim 1, wherein said plane (τ) and said direction (y) of relative advancement of said block (B) of stone material with respect to said frame (14) are perpendicular to each other.

4. The machine (10, 10') for simultaneous cutting of a plurality of slabs (18) from a block (B) of stone material according to claim 1, wherein each of said plurality of band saw blades (11) having a pair of movable spacers (19, 19', 19") from the plurality of spacers the pair of movable spacers (19, 19', 19") is arranged along a respective path of said band saw blade (11), respectively a first movable spacer (19, 19', 19") in proximity of the respective driving pulley (12) and a second movable spacer (19, 19', 19") near the respective driven pulley (13).

5. The machine (10) for simultaneous cutting of a plurality of slabs (18) from a block (B) of stone material according to claim 4, wherein each of said pair of movable spacers (19) is provided with a sliding surface for said respective band saw blade (11), on which the flat side of said respective band saw blade (11) is allowed to slide, the sliding surfaces of the movable spacers (19) of each pair of movable spacers (19) and the flat side of the respective band saw blade (11), in the portion of its path comprised between said movable spacers (19), being arranged on the same sliding plane, parallel to the sliding planes of the other pairs of movable spacers (19) and to said plane (τ).

6. The machine (10') for the simultaneous cutting of a plurality of slabs (18) from a block (B) of stone material according to claim 4, wherein each of said movable spacers (19', 19") comprises hydrostatic pads (19') or a combination of hydrostatic pads (19') and hydrodynamic pads (19").

7. The machine (10, 10') for simultaneous cutting of a plurality of slabs (18) from a block (B) of stone material according to claim 4, wherein each pair of movable spacers (19, 19', 19") is provided with displacement means adapted to modify a relative distance between the sliding plane of said pair of movable spacers (19, 19', 19") and sliding planes of the other pairs of movable spacers (19, 19', 19"), maintaining said sliding plane parallel to said plane (τ).

8. The machine (10) for simultaneous cutting of a plurality of slabs (18) from a block (B) of stone material according to claim 7, wherein said frame (14) is mounted with possibility of rotation on a plane perpendicular to said plane (τ).

9. The machine (10) for simultaneous cutting of a plurality of slabs (18) from a block (B) of stone material according to claim 7, wherein said first axis (A) of rotation of the driving pulleys (12) and said second axis (A') of rotation of the driven pulleys (13) are mounted with possibility of rotation on respective planes perpendicular to said plane (τ).

10. The machine (10') for simultaneous cutting of a plurality of slabs (18) from a block (B) of stone material according to claim 7, wherein said displacement means adapted to modify the relative distance between the sliding plane of said pair of movable spacers (19', 19") and the sliding planes of the other pairs of movable spacers (19', 19") comprise interchangeable spacers or a linear displacement mechanism.

11. The machine (10, 10') for simultaneous cutting of a plurality of slabs (18) from a block (B) of stone material according to claim 1, wherein it comprises means for tensioning said band saw blades (11).

12. The machine (10) for simultaneous cutting of a plurality of slabs (18) from a block (B) of stone material according to claim 11, wherein said means for tensioning said band saw blades (11) comprise a sliding carriage for each band saw blade (11), each sliding carriage being actuated independently of the others.

13. The machine (10) for simultaneous cutting of a plurality of slabs (18) from a block (B) of stone material according to claim 11, wherein said means for tensioning said band saw blades (11) comprise one or more tensioning pulleys for each band saw blade.

14. The machine (10') for simultaneous cutting of a plurality of slabs (18) from a block (B) of stone material according to claim 11, wherein said means for tensioning said band saw blades (11) comprise, for each first driven pulley (13) of each band saw blade (11), at least one fork (14') provided with displacement means along the direction defining the distance between the first axis (A) of rotation and the second axis (A') of rotation.

15. The machine (10) for simultaneous cutting of a plurality of slabs (18) from a block (B) of stone material according to claim 14, wherein said at least one independent fork (14') having means of rotation around an axis perpendicular to the plane ($\tau$).

16. The machine (10, 10') for simultaneous cutting of a plurality of slabs (18) from a block (B) of stone material according to claim 1, wherein the plurality of spacers (19, 19', 19") support the portion of each of said plurality of band saw blades (11) in a different distance from the plane ($\tau$).

\* \* \* \* \*